(12) United States Patent
Svensson

(10) Patent No.: US 10,609,436 B2
(45) Date of Patent: Mar. 31, 2020

(54) CONTROLLING DATA COMMUNICATION IN A MOCA ACCESS NETWORK

(71) Applicant: InCoax Networks AB, Gävle (SE)

(72) Inventor: Thomas Svensson, Gävle (SE)

(73) Assignee: InCoax Networks AB, Gävle (SE)

(*) Notice: Subject to any disclaimer, the term of this patent is extended or adjusted under 35 U.S.C. 154(b) by 0 days.

(21) Appl. No.: 15/822,989

(22) Filed: Nov. 27, 2017

(65) Prior Publication Data

US 2019/0124382 A1 Apr. 25, 2019

(30) Foreign Application Priority Data

Oct. 20, 2017 (EP) .................................... 17197498

(51) Int. Cl.
| | |
|---|---|
| *H04L 12/28* | (2006.01) |
| *H04N 21/258* | (2011.01) |
| *H04L 12/721* | (2013.01) |
| *H04L 12/46* | (2006.01) |
| *H04N 7/16* | (2011.01) |
| *H04N 7/173* | (2011.01) |
| *H04N 21/436* | (2011.01) |

(52) U.S. Cl.
CPC ... *H04N 21/25816* (2013.01); *H04L 12/2801* (2013.01); *H04L 12/2856* (2013.01); *H04L 12/4641* (2013.01); *H04L 45/66* (2013.01); *H04N 7/163* (2013.01); *H04N 7/17318* (2013.01); *H04N 21/43615* (2013.01)

(58) Field of Classification Search
None
See application file for complete search history.

(56) References Cited

U.S. PATENT DOCUMENTS 9,025,533 B1 * 5/2015 Lok ..................... H04L 12/4679
                                                          370/328
2018/0077050 A1 * 3/2018 Tiruveedhula ...... H04L 61/6077

FOREIGN PATENT DOCUMENTS

| CN | 103117911 A | 5/2013 |
| CN | 103117912 A | 5/2013 |
| WO | 0133808 A2 | 5/2001 |

OTHER PUBLICATIONS

European Search Report for related European Patent Application No. EP 17197498.3 dated Nov. 28, 2017.

* cited by examiner

*Primary Examiner* — Cai Y Chen

(74) *Attorney, Agent, or Firm* — Moore & Van Allen PLLC; Henry B. Ward, III

(57) ABSTRACT

A MoCA network management device is configured to enable data communication between client devices that are connected to different MoCA end devices in a MoCA Access network, by providing a redirection function for the MoCA end devices that are configured to be included in a VLAN within the MoCA Access network. The VLAN may include MoCA end devices in different rooms of a building. The MoCA network management device, which is installed intermediate the MoCA end devices and an external data channel, is configured to receive outgoing data generated by client devices that are connected to the MoCA end devices, access a database containing identifiers that are associated with the MoCA end devices in the VLAN, and selectively, based on the database, redirect the outgoing data to a selected MoCA end device among the MoCA end devices in the VLAN.

22 Claims, 6 Drawing Sheets

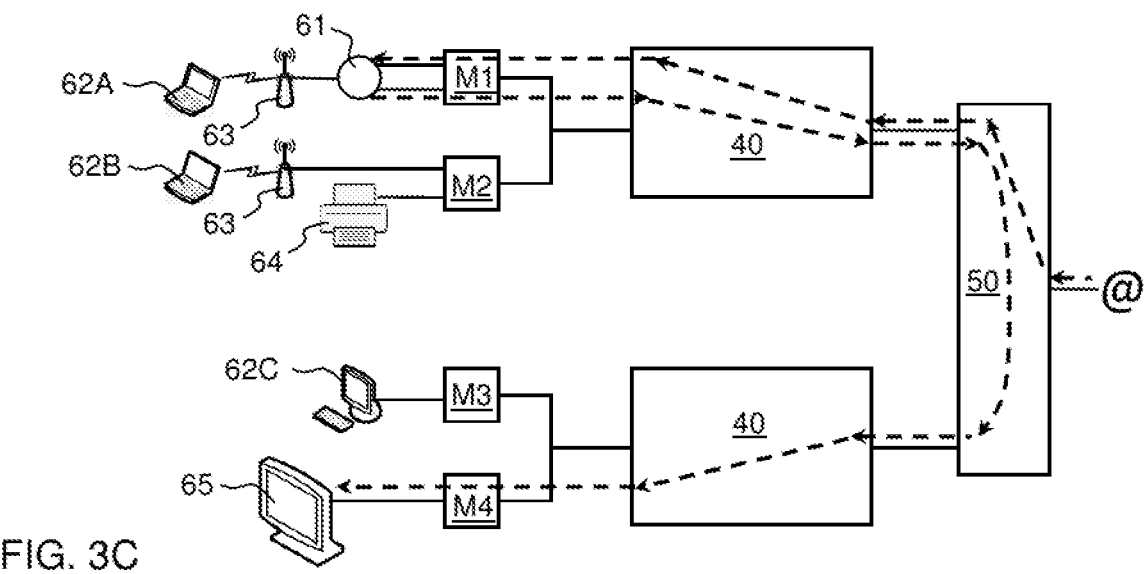
FIG. 3C
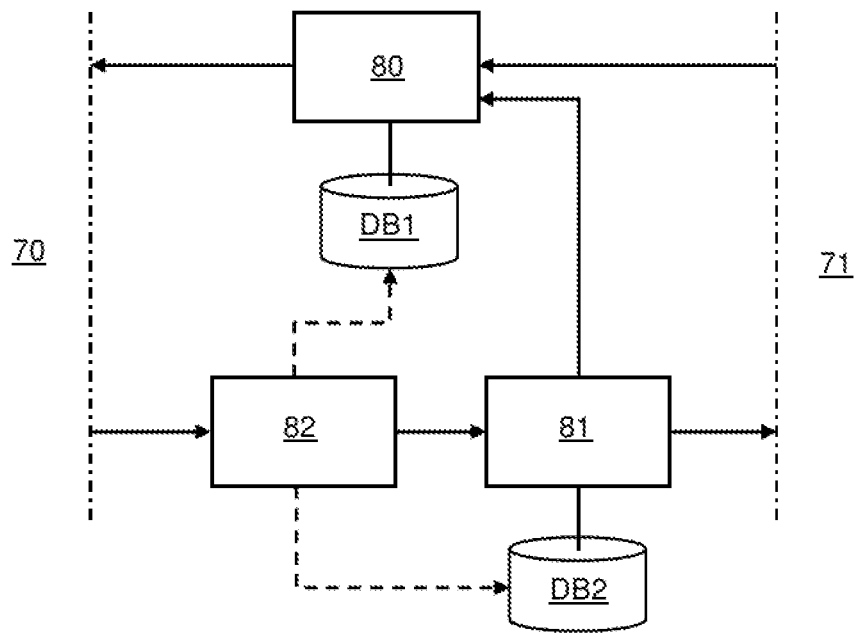
FIG. 4
| VLAN ID | CLIENT ADDRESS | MODEM ID |
|---|---|---|
| VLAN100 | BROADCAST MAC# | - |
| VLAN100 | MAC#1 | M1 |
| VLAN100 | MAC#2 | M2 |
| VLAN100 | MAC#3 | M2 |
| VLAN100 | MAC#4 | M3 |
| VLAN100 | MAC#5 | M4 |
DB2
FIG. 5

CONTROLLING DATA COMMUNICATION IN A MOCA ACCESS NETWORK

TECHNICAL FIELD

The present invention relates generally to data communication over a coaxial cable network, and in particular to control of such data communication in a so-called MoCA Access network.

BACKGROUND ART

Since television became a commodity in homes, hotels, offices and other buildings, coaxial cable (coax in short) networks have regularly been implemented in such facilities. As a result, a large percentage of such facilities built in developed countries during at least the last 50 years are provided with coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coaxial Alliance (MoCA) is an industry standard alliance developing technology for the connected home. MoCA is a layer-2 transport protocol enabling distribution of content over the existing in-home coaxial cabling. MoCA technology is e.g. used as an in-home backbone to guarantee wireless connectivity.

In a MoCA network system, a dedicated MoCA network management device is connected to the coaxial cable network of a building complex, and to an external data channel, such as a supply data cable or an optical fiber. The network management device makes use of the previously un-used frequency spectrum above the regular TV spectrum in coaxial cables for data transportation. The network management device may be configured to merge an incoming data stream from the external data channel and a TV signal, if present, into the same cable and to send it through the coaxial network. At the other end of the coaxial network, the signals are received by a dedicated MoCA end device.

Originally, MoCA was developed to operate as a fully meshed point-to-point network, where each node is interconnected bi-directionally to every other node in the MoCA network.

Recently, MoCA introduced a new broadband access specification, MoCA Access, currently based on the MoCA 2.5 in-home standard and capable of 2.5 Gbps actual data rates. MoCA Access is point-to-multipoint serving up to 63 nodes (end devices). Thus, in MoCA Access, all nodes are isolated from each other. MoCA Access is thereby particularly suited for providing content and data broadband access to a plurality of independent users over an existing coax infrastructure in multi-dwelling units, blocks of flats, hotels, holiday villages etc, as well as commercial buildings, such as restaurants and offices.

While such a MoCA Access network ensures that data is not unintentionally shared between different users in a building, it also suffers from a lack of flexibility in the resulting data communication since it prevents establishment of a direct connection between two or more end devices. With the proliferation of Internet-connected devices, a user is likely to install network-connected devices in different rooms within an apartment and expect to be able to communicate between the different devices, e.g. to operate a computer in one room to print a document on a printer in another room or to stream content to a media player in another room.

BRIEF SUMMARY

It is an objective of the invention to at least partly overcome one or more limitations of the prior art.

Another objective is to enable data communication between any subset of end devices in a MoCA Access network.

A further objective is to provide a solution for such data communication which is simple to implement in a MoCA Access network.

One or more of these objectives, as well as further objectives that may appear from the description below, are at least partly achieved by a MoCA network management device, a system, a method and a computer-readable medium according to the independent claims, embodiments thereof being defined by the dependent claims.

In a first aspect, there is provided a MoCA network management device for controlling data communication in a MoCA Access network in a construction complex having a coaxial cable network. The MoCA network management device comprises: ports for connection to the coaxial cable network intermediate MoCA end devices and an external data channel, wherein the MoCA end devices are configured to operate in accordance with a MoCA Access standard and are configurable to be included in a VLAN within the MoCA Access network; and a control unit which is configured to receive outgoing data generated by client devices connected to the MoCA end devices, access a database containing identifiers that are associated with the MoCA end devices that are included in the VLAN, and selectively, based on the database, redirect the outgoing data to a selected MoCA end device among the MoCA end devices that are included in the VLAN.

In a second aspect, there is provided a system for providing data communication in a MoCA Access network in a construction complex having a coaxial cable network. The system comprises: MoCA end devices which are configured to operate in accordance with a MoCA Access standard and are configurable to be included in a VLAN within the MoCA Access network, and the MoCA network management device according to the first aspect.

In a third aspect, there is provided a method of controlling data communication in a MoCA Access network comprising MoCA end devices connected by a coaxial cable network to an external data channel, wherein at least two of the MoCA end devices are configured to be included in a VLAN within the MoCA Access network. The method comprises the steps of: controlling incoming data from the external data channel, and controlling outgoing data generated by client devices connected to the MoCA end devices. The step of controlling the incoming data comprises: accessing a first database containing identifiers associated with the MoCA end devices within the MoCA Access network; and selectively, based on the first database, forwarding the incoming data to one or more of the MoCA end devices. The step of controlling the outgoing data comprises: accessing a second database containing the identifiers that are associated with the MoCA end devices that are included in the VLAN; and selectively, based on the second database, redirecting the outgoing data to a selected MoCA end device among the MoCA end devices that are included in the VLAN.

In a fourth aspect, there is provided a computer-readable medium comprising program instructions which, when executed by a control unit, cause the control unit to perform the method of the third aspect. The computer-readable medium may be a tangible (non-transitory) product (e.g. magnetic medium, optical disk, read-only memory, flash memory, etc).

Other objectives, as well as features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 3A-3C illustrate signal paths in a MoCA Access network which is configured to define a VLAN in accordance with embodiments of the invention.

FIG. 4 is an example view of a hardware structure for providing a VLAN in a MoCA Access network.

FIG. 5 shows an example of a database generated and used in the hardware structure of FIG. 4.

DETAILED DESCRIPTION OF EXAMPLE EMBODIMENTS

Figure 1A:
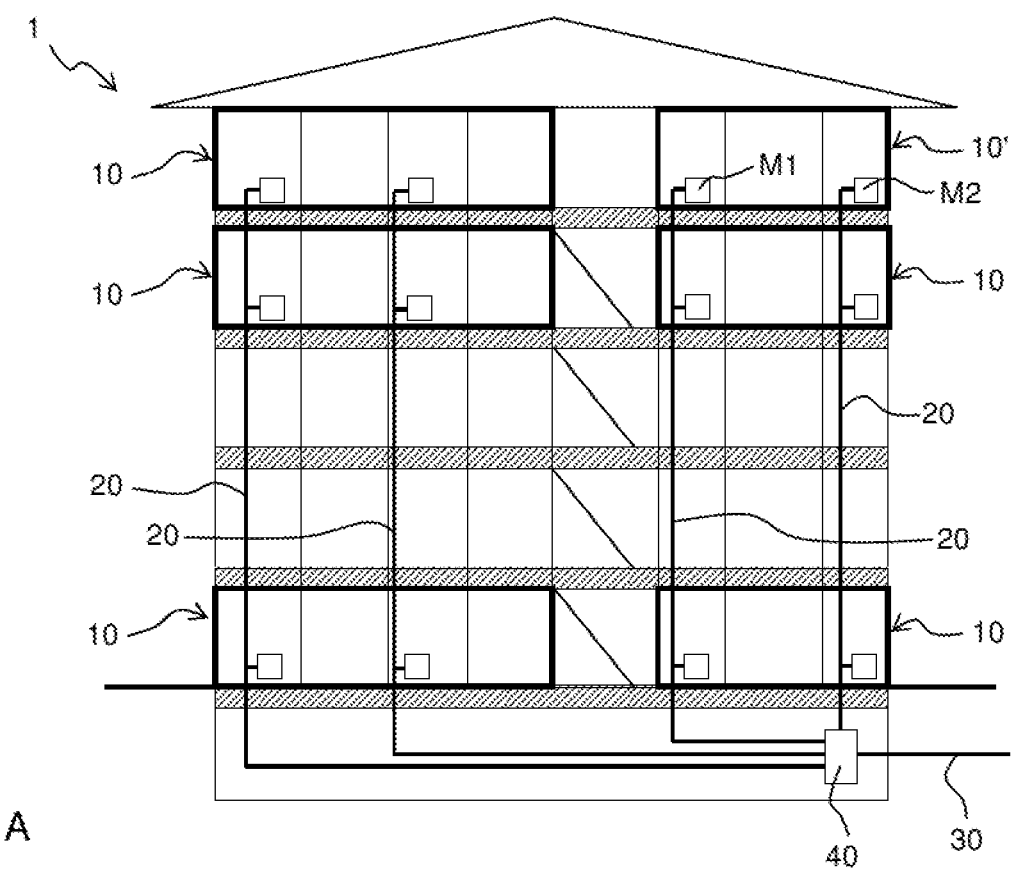
FIGS. 1A-1B are section views of two buildings that include a respective MoCA Access network.

Embodiments of the present invention will now be described more fully hereinafter with reference to the accompanying drawings, in which some, but not all, embodiments of the invention are shown. Like reference signs refer to like elements throughout.

Also, it will be understood that, where possible, any of the advantages, features, functions, devices or operational aspects of any of the embodiments of the present invention described or contemplated herein may be included in any of the other embodiments of the present invention described or contemplated herein. In addition, where possible, any terms expressed in the singular form herein are meant to also include the plural form, and vice versa, unless explicitly stated otherwise. As used herein, "at least one" shall mean "one or more" and these phrases are intended to be interchangeable. Accordingly, the terms "a" and "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will be understood that, when an element is referred to as being "connected" to another element, it can be directly connected to the other element or intervening elements may be present. In contrast, when an element is referred to as being "directly connected" to another element, there are no intervening elements present. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Embodiments of the invention are directed to MoCA Access networks, which are characterized by operating under any current or future MoCA Access specification to provide point-to-multipoint serving of end devices through a coaxial network. Embodiments are suited to enable data communication between clients that are connected to different end devices in such a MoCA Access network. Conceptually, this is achieved by enabling a Virtual LAN (VLAN) among a subset of the end devices that are included in the MoCA Access network. The structure and functionality of such embodiments will be described below in relation to exemplifying installations of coaxial networks in construction complexes. For the sake of completeness, it may be noted that the embodiments as described herein may be employed in a construction complex comprising a plurality of buildings having a common coaxial network, or interconnected coaxial networks.

Figure 1B:
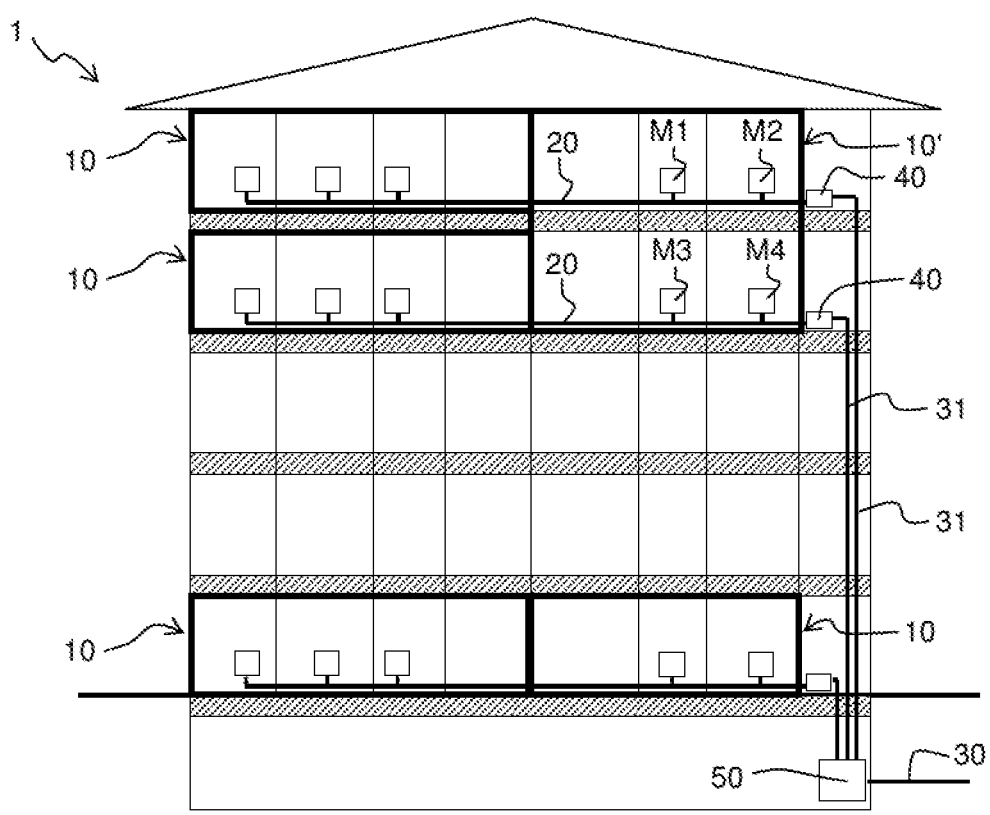

FIGS. 1A-1B illustrate, by way of example, a respective construction complex 1 in the form of a single building. The building 1 may e.g. be a block of apartments or a hotel that comprises a number of confined building units, such as apartments, hotel rooms, offices, etc. In FIGS. 1A-1B, a few such building units are indicated by thicker lines and designated by reference numeral 10. The building units 10 comprise sub-units, e.g. rooms, which are indicated by thinner lines in FIGS. 1A-1B. The following description will refer to one building unit in particular, designated by reference numeral 10' in the respective building 1. A coaxial cable network 20 ("coaxial network") is provided throughout the building 1, having sockets in all or a plurality of the different building units. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality.

The building 1 in FIG. 1A comprises a coaxial network 20 with a plurality of vertical branches, where each branch has sockets along its vertical extent, i.e. on the different floors of the building 1. For example, if the room layout is similar on all floors, the respective branch may have been installed to provide sockets in similar room types, e.g. living rooms, bedrooms, kitchens, etc. This means that sockets on a respective branch are located in different building units, and that the different sockets within a building unit typically belong to different branches.

The building in FIG. 1B comprises a coaxial network 20 with a plurality of horizontal branches, where each branch has sockets along its horizontal extent, i.e. on a respective floor of the building 1. This means that the sockets on the respective branch may be located in different building units, as shown. Depending on the layout of building units, all sockets in a building unit may or may not belong to the same branch. In the example of building unit 10', which comprises rooms on two floors, the sockets in different rooms are part of different branches of the coaxial network.

It should be understood that FIGS. 1A-1B are examples and that embodiments of the invention are applicable to any layout of the coaxial network 20, including but not limited to so-called star-cascade networks, tap-cascade networks and star-networks.

A MoCA Access network is implemented on the coaxial network 20 in the building 1 of FIGS. 1A-1B, by use of one or more dedicated network management devices 40, denoted "MoCA controllers" in the following, and a plurality of dedicated MoCA end devices, which are represented by boxes within the building units 10, 10' and are denoted "MoCA modems" in the following. The MoCA controller 40 makes use of the previously un-used frequency spectrum above the regular TV spectrum (5-790 MHz) in coaxial cables for data transportation. The MoCA controller 40 operates under a MoCA Access specification and may be configured to merge an incoming data stream and a TV-signal, where applicable, into the same cable and to send it through the coaxial network 20 to the MoCA modems, which are connected to the sockets of the coaxial network 20 and operate under the MoCA Access specification. Since the data stream and TV-signal are using separate frequency spectrums, the TV signal is effectively isolated from the data stream.

In FIG. 1A, a MoCA controller 40 is connected intermediate the vertical branches of the coaxial network 20 and an external data channel 30, such as a supply data cable or an optical fiber. The MoCA controller 40 may e.g. be installed at the entry point of the external data channel 30, e.g. in a basement, as shown in FIG. 1A, or on a loft of the building 1, and may be connected after a TV amplifier. In FIG. 1A, the MoCA modems within building unit 10' are designated by M1, M2.

In FIG. 1B, there is one MoCA controller for each horizontal branch. Thus, one MoCA controller 40 is configured to serve the MoCA modems on the branch on the top floor, and another MoCA controller 40 is configured to serve the MoCA modems that are connected to the branch on the floor below. In FIG. 1B, the MoCA modems within building unit 10' are designated by M1-M4. The MoCA controllers 40 may be located on the respective floor, as shown, or at the entry point of the external data channel 30, e.g. in the basement. In FIG. 1B, the MoCA controllers 40 are connected to the external data channel 30 via a data distribution device 50, e.g. a repeater hub or network switch, i.e. a network management device configured to relay incoming signals from the external data channel 30 to the MoCA controllers 40 and outgoing signals from the MoCA controllers 40 to the external data channel 30. For convenience, the distribution device 50 is denoted "switch" in the following. The MoCA controllers 40 are connected to the switch 50 by a connecting cable 31, e.g. an optical fiber or a network cable such as an Ethernet cable.

Typically, the MoCA Access network is a local area network (LAN) within the building 1 and possibly further buildings of the construction complex. The LAN is interfaced with a wide area network (WAN), where the WAN interface may be arranged in the controller 40 in FIGS. 1A-1B, the switch 50 in FIG. 1B or a station located outside the building 1, e.g. serving a plurality of buildings within one or several construction complexes.

The MoCA Access standard has been intentionally designed to isolate all MoCA modems from each other (point-to-multipoint) and therefore does not allow data communication to be established between the modems via the coaxial network 20. However, it might be convenient and desirable for a resident of a building unit to set up communication between client devices ("clients") that are connected to different MoCA modems within a building unit, e.g. between modems M1 and M2 in FIG. 1A.

Figure 2:
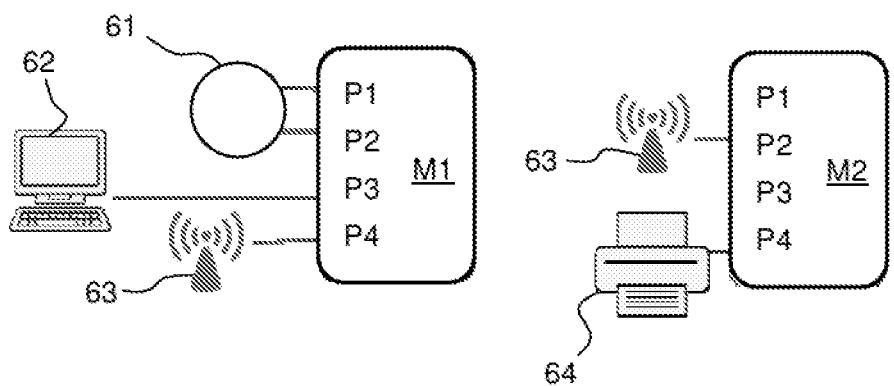
FIG. 2 illustrates two MoCA modems with connected client devices.

FIG. 2 shows an example use case for modems M1 and M2 in FIG. 1B. On modem M1, port P1 is configured as a WAN port for Internet access, and ports P2-P4 are configured as LAN ports. A conventional router 61 is wired to ports P1, P2, a computer 62 is wired to port P3, and a wireless access point (WAP) 63 is wired to port P4. This set-up allows the resident of the building unit 10' to access the Internet, through the router 61, directly by the computer 62 or by wireless connection to the WAP 63. On modem M2, ports 1-4 are configured as LAN ports, where a WAP 63 is wired to port P2 and a printer 64 is wired to port P4. This setup allows a user to access the printer 63 via the WAP 63 on modem M2. However, it is not possible for the user to access the printer 64 on modem M2 from the computer 62 on modem M1 via the coaxial network 20.

Embodiments of the invention overcome this limitation by enabling virtual LANs (VLANs) in the MoCA Access network. This is achieved by providing a dedicated redirection function for outgoing data in the MoCA Access network. Specifically, any number of MoCA modems, or any subset of ports on different MoCA modems, may be configured to be part of such a VLAN, and the redirection function will selectively guide data between clients that are connected to modems/ports within the VLAN.

Figure 3A:
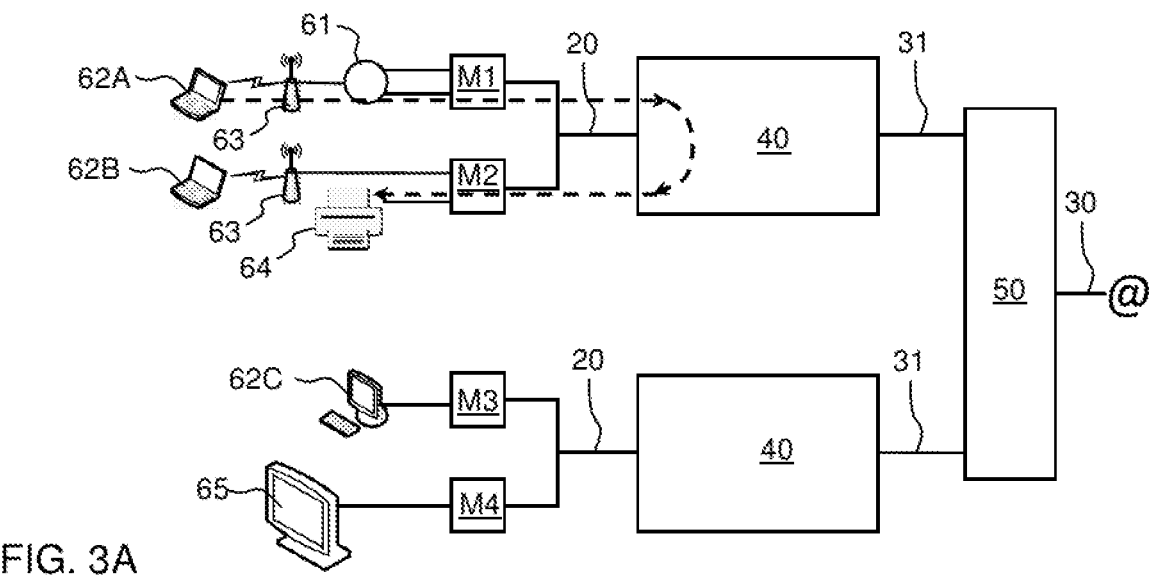
Figure 3B:
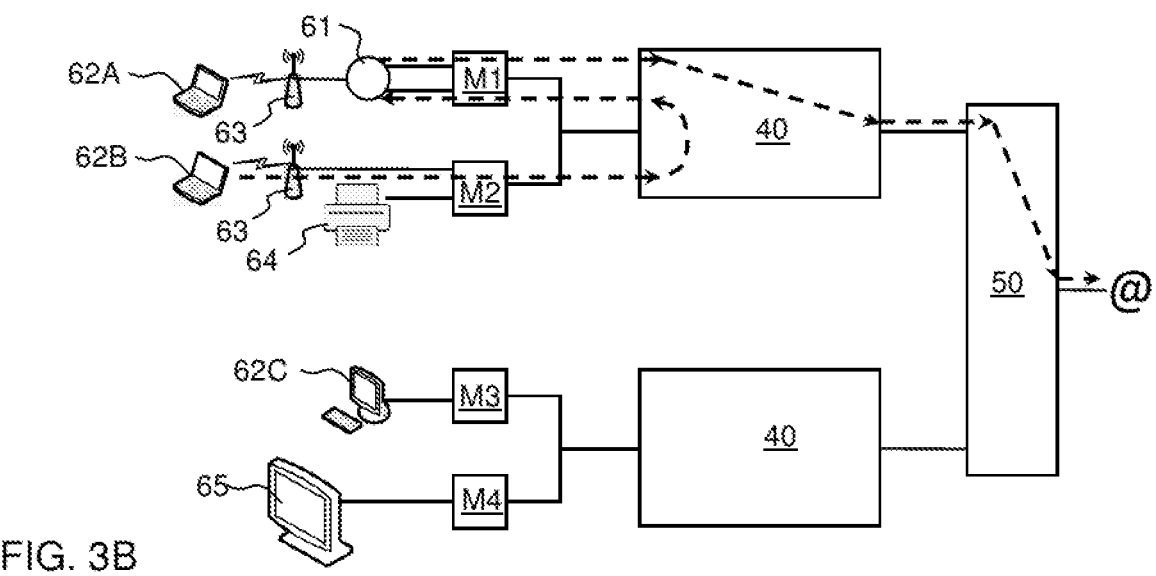

Signal paths in a MoCA Access network by use of such a redirection function is exemplified in FIGS. 3A-3C with respect to the building unit 10' in FIG. 1B. In the illustrated example, a number of clients are connected to the modems M1-M4. Like in FIG. 2, a router 61 is wired to modem M1, and a WAP 63 and a printer 64 are wired to modem M2. Another WAP 63 is wired to or integrated in the router 61. Further, a computer 62C is wired to modem M3, and a television apparatus (TV) 65 is wired to modem M4. In FIGS. 3A-3B, the redirection function is implemented in the MoCA controller 40 to enable data communication between clients connected to the ports of modems M1 and M2, which are all defined to be part of a common VLAN. As indicated by dashed arrows in FIG. 3A, the redirection function enables a user to access the printer 64, which is wired to modem M2, from a computer 62A, which is connected to modem M1 through the combination of WAP 63 and router 61. The redirection function in the MoCA controller 40 intercepts the data, determines that it is destined for modem M2 within the VLAN and redirects the data to modem M2 and client 64. As indicated by dashed arrows in FIG. 3B, the redirection function similarly enables a user to access the Internet through router 61, which is wired to modem M1, from a computer 62B, which is connected to modem M2 via WAP 63. The redirection function in the MoCA controller 40 intercepts the data, determines that it is destined for modem M1 within the VLAN and redirects the data to modem M1 and router 61, which communicates the data via the WAN port on modem M1, the MoCA controller 40 and the network switch 50 to the external data channel. In FIG. 3C, the redirection function is implemented in the switch 50, thereby enabling communication between MoCA modems on different floors in the building unit 10' in FIG. 1B. As indicated by dashed arrows, incoming data destined for the TV apparatus 65 from the external data channel is transmitted via the switch 50 and the MoCA controller 40 to the WAN port on modem M1 and thus to router 61, which routes the data via the LAN port on modem M1, the MoCA controller 40 and the switch 50. The redirection function in the switch 50 intercepts the data, determines that it is destined for modem M4 within the VLAN and redirects the data through MoCA controller 40 to modem M4 and TV apparatus 65. It is understood that the redirection function may be implemented in the MoCA controllers 40 as well as the switch 50.

The redirection function will now be described in more detail. The following description presumes that each client is associated with an identifier which is unique at least within the MoCA Access network. The identifier may be a conventional network address, e.g. an Ethernet address. In the following examples, the identifier is assumed to be a MAC address. MAC addresses are conventionally assigned to network interfaces for communications at the data link layer of a network segment. It is conceivable that a client is associated with more than one identifier. For example, as known in the art, the router 61 may have separate MAC addresses for its LAN and WAN ports. It is also presumed that the VLAN, which is defined within the MoCA Access network, is associated with a VLAN ID. Since plural VLANs may be defined within a single MoCA Access network, each VLAN ID is unique at least within the MoCA Access network.

As used herein, "outgoing data" designates data that is generated by clients and transmitted via MoCA modems towards the external data channel 30. Conversely, "incoming data" designates data that arrives in the opposite direction. The incoming data may originate from within the MoCA Access network or from the external data channel 30. The outgoing data that is transmitted from a MoCA modem includes an origin identifier and a destination identifier. The origin identifier designates the identity of the client that generated the outgoing data and may thus be a MAC address. The destination identifier designates the identity of the client that is intended to receive the data and may thus also be a MAC address. The outgoing data also includes the VLAN ID for the VLAN within which the outgoing data has been generated.

FIG. 4 is a schematic block diagram of an exemplifying structure for implementing the redirection function. Conceptually, the structure has a first side 70, which faces towards the MoCA modems and receives outgoing data, and a second side 71, which faces towards the external data channel 30 and receives incoming data. For example, the structure may be included in the MoCA controllers 40 and/or the switch 50 in FIGS. 3A-3C. The structure comprises a filter module 80, which operates a filter function on the incoming data from the second side 71 to selectively allow the incoming data to pass to the first side 70. Specifically, the filter module 80 is configured to only transmit incoming data destined for the clients that are connected to MoCA modems on the first side 70. All other incoming data is blocked by the filter module 80. The module 80 selects the incoming data to be either passed or blocked by comparing the destination identifier in the incoming data to a first database DB1, which contains MAC addresses of the clients that are connected to the MoCA modems on the first side 70. The structure further comprises a redirection module 81, which is configured to selectively redirect the outgoing data from the first side 70 to one or more MoCA modems within the VLAN. Specifically, if the outgoing data is destined for a client that is connected to a modem/port within the VLAN, the module 81 redirects the outgoing data to this modem. Other outgoing data is passed to the second side 71. The module 81 selects the outgoing data to be either passed or redirected by comparing the destination identifier in the outgoing data to a second database DB2, which contains MAC addresses of the clients that are located on the first side 70 and are connected to a modem/port within the VLAN. The databases DB1, DB2 may be predefined and fixed, but are preferably dynamically updated whenever a new client connects to and communicates via a MoCA modem. To this end, the structure comprises a learning module 82, which is configured to automatically and dynamically populate DB1 and DB2. The module 82 parses all outgoing data from the first side 70. Whenever a new origin identifier is detected in the outgoing data, the module 82 adds this origin identifier (MAC address) to DB1, as indicated by a dashed arrow. If the origin identifier is associated with the VLAN, the module 82 also adds this origin identifier (MAC address) to DB2, as indicated by a dashed arrow. It is realized that a plurality of different VLANs may be defined within the MoCA Access network without any modification of the structure in FIG. 4, provided that DB2 contains the identifiers (e.g. MAC addresses) of the clients that are included in the respective VLAN.

It should be noted that the filter function and the redirection function may, but need not, be implemented on the same device in the MoCA Access network. For example, the filter module 80 may be included in a MoCA controller 40, and the redirection module 81 may be included in a switch 50 (cf. FIG. 3B).

FIG. 5 shows an example of the second database DB2 for the modems M1-M4 in FIGS. 3A-3C. A first column contains the VLAN ID (here, "VLAN100"). This column may be omitted if DB2 is confined to a single VLAN. The second column ("CLIENT ADDRESS") contains the MAC addresses of the clients that are connected to the modems/ports within the VLAN, and the third column ("MODEM ID") contains an identifier of the modem to which the respective client is connected. The modem IDs may be predefined and unique within the MoCA Access network, and may be given by configuration data of the MoCA access network. By the modem IDs, DB2 associates the client addresses with the MoCA modems that are included in the respective VLAN.

In the example of FIG. 5, DB2 contains the following client addresses: MAC #1 of the LAN port on the router 61 that is wired to modem M1, MAC #2 of the WAP 63 that is wired to modem M2, MAC #3 of the printer 64 that is wired to the modem M2, MAC #4 of the computer 62C that is wired to modem M3, and MAC #5 of the TV apparatus 65 that is wired to modem M4. As seen, DB2 also includes a broadcast identifier ("BROADCAST MAC #"), which is predefined and may be included as destination identifier in outgoing data. Such a destination identifier indicates to the redirection module 82 that the outgoing data should be broadcast to all modems within the VLAN. The second database DB2 may be implemented by any suitable data structure, such as a table, a list, an array, a tree structure, etc. DB1 may be of similar structure as DB2 and may contain client addresses associated with modem IDs. Typically, DB2 contains a subset of the client addresses in DB1. Although DB1 and DB2 are illustrated as separate entities in FIG. 4, they may be embodied in a common data structure.

A VLAN may be configured for a group of modems in a MoCA Access network by an operator or administrator of the MoCA network assigning a dedicated VLAN ID for the VLAN and configuring each of the modems in the group to associate its ports, or a subset thereof, with the VLAN ID and to add the VLAN ID to all data received from clients connected to these port(s). In the example setup in FIG. 2, the operator may configure modem M2 to associate all ports 1-4 with the dedicated VLAN ID, and modem M1 to associate ports 2-4 with the dedicated modem ID. Modem M1 may be further configured to terminate the VLAN for Internet connection at port 1. To configure the VLAN, the operator further adds a predefined broadcast identifier to DB2 in association with the VLAN ID. The operator may also configure the learning module 82 with the VLAN ID so that the module 82 properly populates DB2 with MAC addresses of clients that are connected to modems/ports within the VLAN.

When the VLAN is configured, a client connected to the VLAN may establish data communication data in conventional way by sending a DHCP Discover message as broadcast to find a DHCP server. The DHCP server replies to the client with an IP configuration and the client accepts the configuration. The client now has a valid IP configuration with IP address, netmask, DNS and default gateway.

Reverting to the example in FIG. 3A, if a configured client (e.g. computer 62A) needs to communicate with another client on the VLAN, e.g. printer 64, the client may send an ARP request as broadcast to request the MAC address of the printer 64. In response, the printer 64 sends an ARP reply with the requested MAC address. Based on the ARP request and the ARP reply, the learning module 82 may populate DB1 and DB2 with the MAC addresses of the client and the printer, whereupon data communication may commence.

Reverting to the example in FIG. 3B, if a configured client (e.g. computer 62B) needs to communicate with another client on the Internet, the communication must go through the router 61. The client sends an ARP request to default gateway (i.e. the router 61) asking for the MAC address of the router's LAN port. In response, the router 61 sends an ARP reply with the requested MAC address. Based on the ARP reply, the learning module 82 may populate DB1 and DB2 with the MAC address of the router 61. Then, when the client starts sending IP packets to the router 61, the redirection function directs the IP packages to the router 61, which performs its conventional operation of routing and translating the IP packets between its LAN and WAN ports.

Conversely, in the example of FIG. 3C, if the router 61 receives an incoming IP packet destined for the TV apparatus 65 on its WAN port, the router 61 may send an ARP request for the receiving client. In response, the TV apparatus 65 sends an ARP reply with the requested MAC address. Based on the ARP reply, the learning module 82 may populate DB1 and DB2 with the MAC address of the TV apparatus 65. Then, when the router 61 sends data corresponding to the IP packet to the TV apparatus 65, the redirection function directs the IP packet to the TV apparatus 65.

It should be understood that the ARP request only needs to be transmitted when the transmitting client does not know the MAC address of the receiving client. In all other instances, the transmitting client may directly generate outgoing data for the receiving client, where the outgoing data includes the MAC address of the receiving client as destination identifier and the MAC address of the transmitting client as origin identifier. As noted above, the modem to which the transmitting client is connected adds the VLAN ID to the outgoing data.

Figure 6:
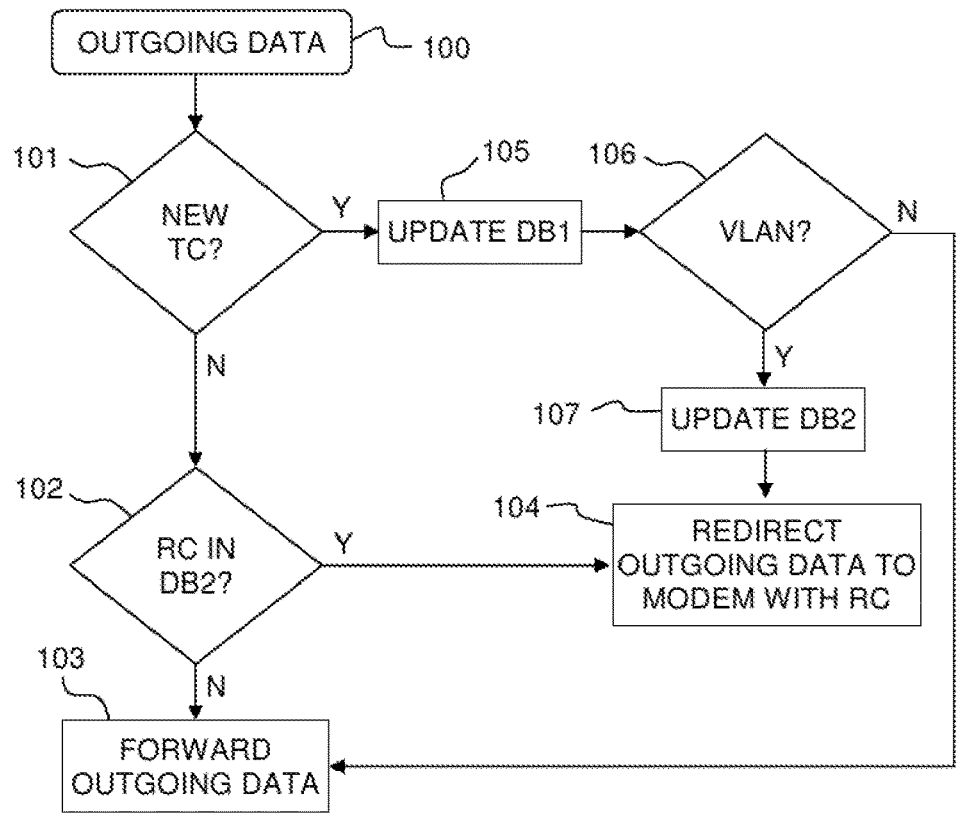
FIG. 6 is a flow chart for a method of handling outgoing data in a MoCA Access network according to an embodiment.

FIG. 6 is a flow chart of a method of controlling outgoing data communication in a MoCA Access network. The method includes both the redirection function and the database update function. When outgoing data is received (step 100), the method checks if the transmitting client (TC) is in DB1 (step 101), e.g. by comparing the origin identifier in the outgoing data to the MAC addresses in DB1. If TC is found in DB1, the method proceeds to check if the receiving client (RC) is in DB2 (step 102), e.g. by comparing the destination identifier in the outgoing data to the MAC addresses in DB2. Step 102 may be performed for all outgoing data, or only for outgoing data that includes a specific VLAN ID or a range of valid VLAN IDs. The check in step 102 may require that the combination of VLAN ID and destination identifier is found in DB2. If no match is found, the method forwards the outgoing data towards the external data channel (step 103). If RC is found in DB2, the method proceeds to redirect the outgoing data to the related modem, i.e. the modem to which RC is connected, as given by the modem ID in DB2 (step 104). Reverting to step 101, if TC is not found in DB1, the method proceeds to add the MAC address given by the origin identifier to DB1 (step 105). Then, the method checks if the outgoing data originates from within a VLAN, based on the VLAN ID in the outgoing data (step 106). If not, the method proceeds to step 103. If the outgoing data originates from within a VLAN, the method adds the MAC address given by the origin identifier to DB2 in association with the VLAN ID (step 107). Then, the method proceeds to step 104.

In a special case, the outgoing data includes the broadcast identifier as RC. For example, the broadcast identifier may be included in the above-mentioned ARP requests. Although not shown in FIG. 6, step 102 may proceed to step 104 if RC is found to match the broadcast identifier, and step 104 then redirects the outgoing data to all modems that are associated with the VLAN ID according to DB2 (cf. FIG. 5). Optionally, step 102 may also proceed to step 103 which forwards the outgoing data towards the external data channel 30.

Figure 7:
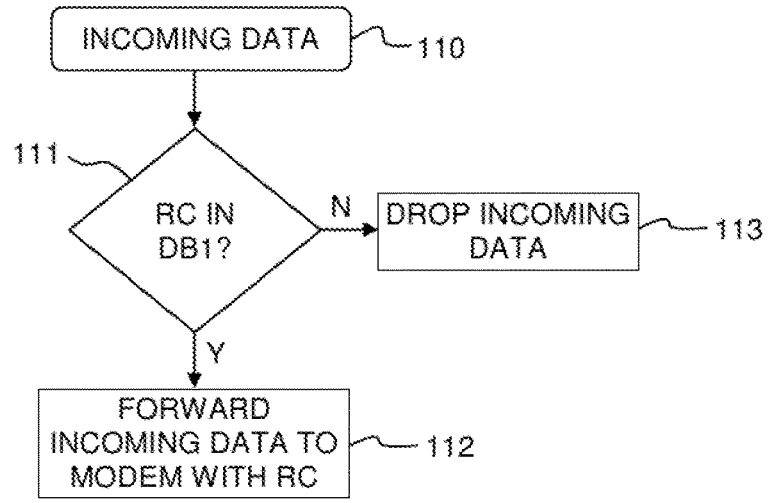
FIG. 7 is a flow chart for a method of handling incoming data in a MoCA Access network.

FIG. 7 is a flow chart of a method of controlling incoming data communication in a MoCA Access network. The method performs the filter function of the filter module 80 in FIG. 5. When incoming data is received (step 110), the method checks if the receiving client (RC) is in DB1 (step 111), e.g. by comparing the destination identifier in the incoming data to the MAC addresses in DB1. If RC is found in DB1, the method forwards the incoming data to the related modem, i.e. the modem to which RC is connected, as given by the modem ID in DB1. If RC is not found in DB1, the incoming data is dropped and thereby blocked.

Figure 8:
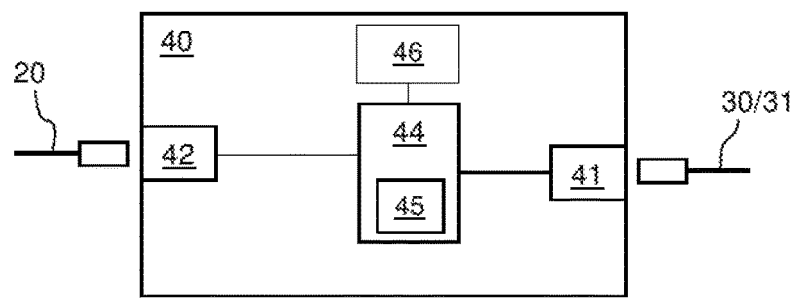
FIG. 8 is a block diagram of a MoCA network management device.

FIG. 8 schematically illustrates a MoCA controller 40. In the illustrated example, the MoCA controller 40 comprises a first port 41 for connection to the external data channel 30, either directly or via a connecting cable 31, and a second port 42 for connection to one or more modems via the coaxial network 20. It is understood that the MoCA controller 40 may have more than one first or second port 41, 42. The MoCA Controller 40 comprises a control unit 44, inter alia for controlling communication with the MoCA modems that are connected to the second port 42 by the coaxial network 20. For this purpose, the control unit 44 may include a MoCA chip 45, which is a hardware chip implementing the MoCA Access protocol and the HW required for fulfilling the MoCA Access specification, and such chips are available on the market. Hardware in the MoCA chip typically includes baseband radio/power amplifier and low noise amplifier, mixers, RF switches, microprocessor, clock circuitry and an Ethernet packet bus of some type. MoCA chip makers apply the MoCA Access specification to the chip design by selection of chip content required to fulfill specification. The control unit 44 may be further configured to perform the methods described above with reference to FIGS. 7-8. The methods may be implemented by software (computer instructions) that causes a processor on the MoCA chip 45, or a separate processor, to perform the method. The software may be stored on a computer memory 46, which may be included in the MoCA chip 45 or separate therefrom. The computer memory 46 may also hold DB1, DB2.

FIG. 8 may also serve to generally illustrate the switch 50, which comprises a first port 41 for connection to the external data channel 30 and a plurality of second ports 42 for connection to MoCA modems via one or more MoCA controllers. The control unit 44 in switch 50 need not include a MoCA chip, but typically includes a processor and computer memory, which may be configured to implement the methods in FIGS. 7-8.

In the examples in FIGS. 3A-3C, the router function for the VLAN is either implemented by a dedicated router 61 that is wired to a MoCA modem, or integrated in the MoCA modem itself. Such an embodiment has the advantage of giving the user in the building unit control over the router configuration. However, the cost of bandwidth may be high.

Figure 9A:
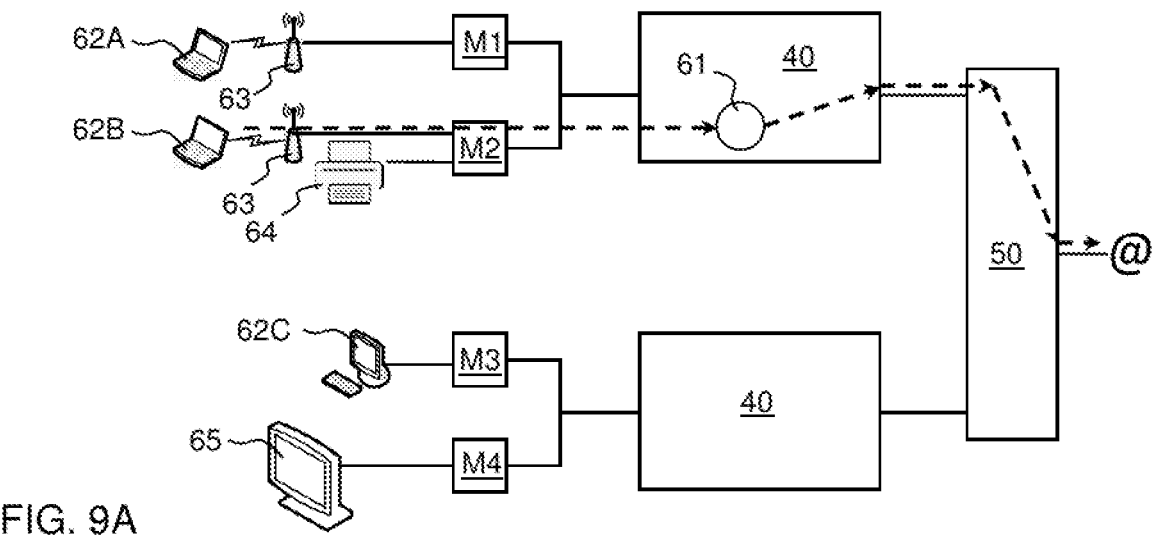
FIGS. 9A-9B and 10A-10B illustrate signal paths in a MoCA Access network which is configured in accordance with embodiments of the invention.
Figure 9B:
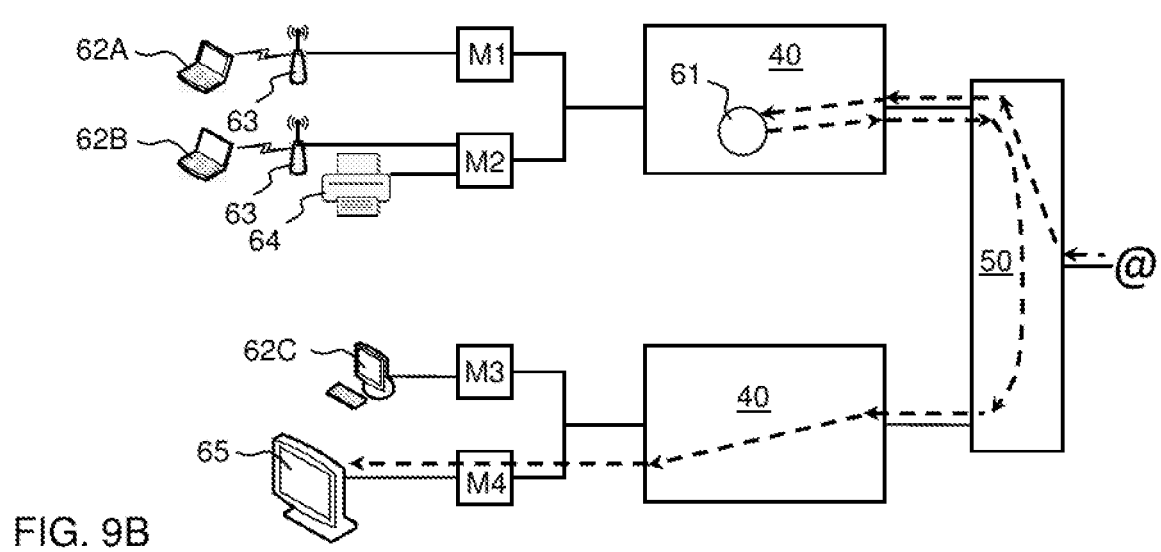

A lower cost of bandwidth may be achieved if the router function is instead integrated in a MoCA controller. Such an embodiment obviates the need for a router in each building unit and may thus reduce hardware cost. The router function in the MoCA controller forms a virtual router, which may be configured to act as a DHCP and DNS server and is only accessible for clients connected to modems/ports within the VLAN. Thus, outgoing data from within the VLAN destined for the Internet will be redirected to the virtual router. This is exemplified in FIG. 9A which corresponds to FIG. 3A but with a virtual router 61 located in the MoCA controller 40. Similarly, incoming data from the Internet will be received by the virtual router 61 and transmitted as outgoing data to the redirection function which redirects the incoming data to the related modem within the VLAN, in the same way as described in the foregoing. FIG. 9B corresponds to FIG. 3C and illustrates the signal path for such incoming data when a virtual router 61 is implemented in the MoCA controller 40. As seen, the capacity load on the coaxial network is reduced compared to FIGS. 3A-3C. In this alternative, the operator of the MoCA Access network may give the individual user the ability to define at least some settings of the router function.

Figure 10A:
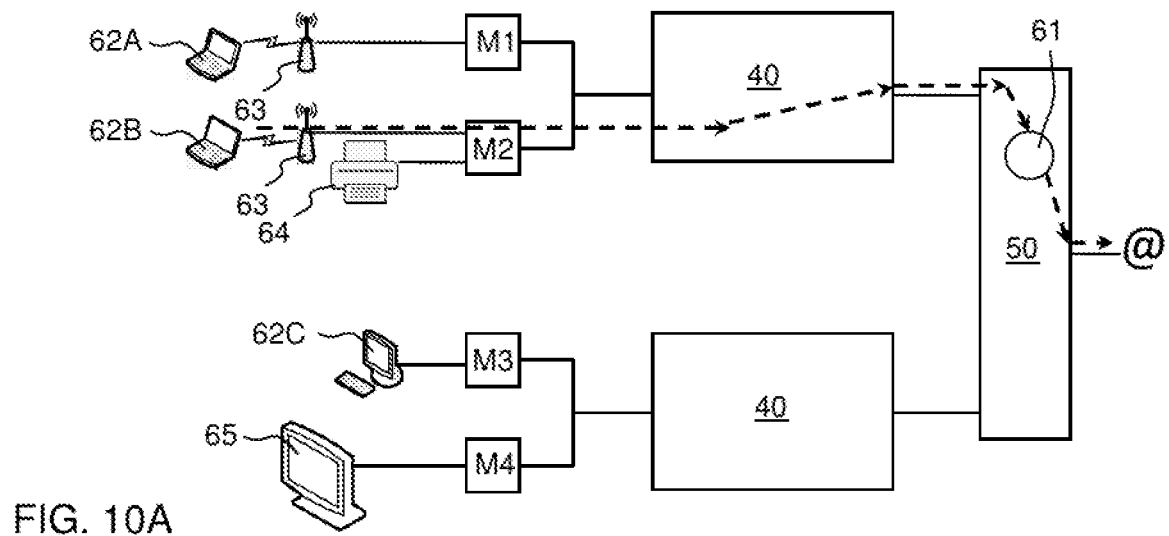
Figure 10B:
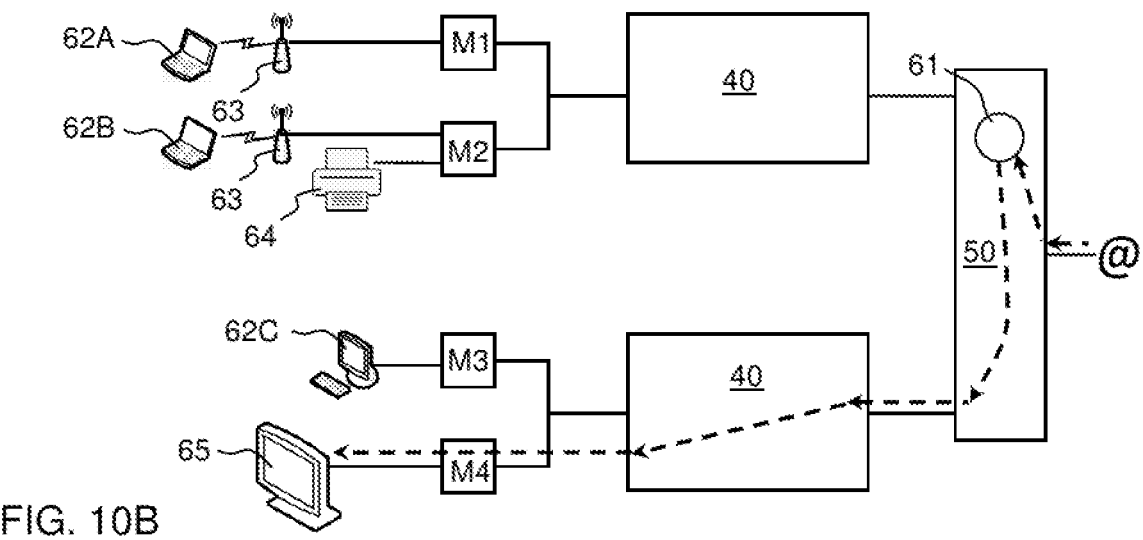

It is also conceivable to implement a virtual router on the uplink side, e.g. in the switch 50. FIGS. 10A-10B correspond to FIGS. 9A-9B but with the virtual router 61 located in the switch 50. As seen, the capacity load on the coaxial network is low. However, implementation is more complex and the cost of equipment is higher. In this alternative, the operator of the MoCA Access network normally defines all settings of the routing function.

The description given above relates to various general and specific embodiments, but the scope of the invention is limited only by the appended claims.

The invention claimed is:

1. A Multimedia Over Coax (MoCA) network management device for controlling data communication in a MoCA Access network having a coaxial cable network and an external data channel connected to the coaxial cable network, the device comprising:
    ports for connection to the coaxial cable network intermediate a plurality of MoCA network nodes and the external data channel, wherein the MoCA network nodes are configured to (a) operate in accordance with a MoCA Access standard designed to prohibit data communication to be established between the MoCA network nodes via the coaxial cable network, and (b) be included in a common VLAN having a same Internet Protocol (IP) subnet within the MoCA Access network;
    a database containing identifiers that are associated with the MoCA network nodes that are included in the common VLAN, and
    a control unit which is configured to:
        control data communication between at least one selected from the group of (i) the MoCA network nodes and (ii) client devices connected to the MoCA network nodes, wherein controlling the data communication includes:
            receiving outgoing data generated by client devices connected to the MoCA network nodes,
            accessing the database, and
            selectively, based on the database, redirecting the outgoing data to a selected MoCA network node among the MoCA network nodes that are included in the common VLAN.

2. The MoCA network management device of claim 1, wherein the identifiers are network addresses of the client devices that are connected to the MoCA network nodes.

3. The MoCA network management device of claim 2, wherein the network addresses are MAC addresses.

4. The MoCA network management device of claim 2, wherein the database comprises an association between the network addresses of the client devices and the MoCA network nodes that are included in the common VLAN.

5. The MoCA network management device of claim 1, wherein the control unit is further configured to redirect the outgoing data to the selected MoCA network node provided that the outgoing data includes a VLAN identifier which is assigned to the common VLAN.

6. The MoCA network management device of claim 1, wherein the control unit is configured to retrieve a destination identifier from the outgoing data, and compare the destination identifier to the identifiers in the database to identify the selected MoCA network node.

7. The MoCA network management device of claim 6, wherein the control unit is further configured to, when the destination identifier is not found among the identifiers in the database, forward the outgoing data towards the external data channel.

8. The MoCA network management device of claim 6, wherein the control unit is further configured to, when the destination identifier matches a dedicated broadcast identifier among the identifiers in the database, redirect the outgoing data to all the MoCA network nodes that are included in the common VLAN.

9. The MoCA network management device of claim 6, wherein the control unit is further configured to dynamically update the database to contain an origin identifier included in the outgoing data, provided that the outgoing data includes a VLAN identifier which is assigned to the common VLAN.

10. The MoCA network management device of claim 9, wherein the origin identifier is indicative of the client device that generated the outgoing data.

11. The MoCA network management device of claim 9, further comprising a second database, wherein the control unit is further configured to dynamically update the second database to contain the origin identifier irrespective of presence of the common VLAN identifier in the outgoing data.

12. The MoCA network management device of claim 11, wherein the control unit is further configured to receive incoming data, access the second database, and selectively, based on the second database, forward the incoming data to one or more of the MoCA network nodes.

13. The MoCA network management device of claim 1, wherein the device is configured for connection to the coaxial cable network and operable to control the MoCA network nodes.

14. The MoCA network management device of claim 1, wherein the device is connected to the external data channel and separate branches of the coaxial cable network and operable to distribute data between the external data network and the different branches of the coaxial cable network.

15. The MoCA network management device of claim 1, further comprising a router for the MoCA network nodes that are included in the common VLAN.

16. The MoCA network management device of claim 1, wherein a subset of the MoCA network nodes are configured to be included in the common VLAN, said subset of MoCA network nodes being connected to the coaxial cable network within a confined building unit of the construction complex.

17. A system for providing data communication in a MoCA Access network in a construction complex having a coaxial cable network, said system comprising: MoCA network nodes which are configured to operate in accordance with a MoCA Access standard and are configurable to be included in a common VLAN within the MoCA Access network, and the MoCA network management device according to claim 1.

18. The system of claim 17, further comprising a router which is arranged in or connected to one of the MoCA network nodes that are included in the common VLAN.

19. The system of claim 17, wherein each of the MoCA network nodes that are included in the common VLAN are configured to include, in the outgoing data, a VLAN identifier which is assigned to the common VLAN.

20. A method of controlling data communication in a MoCA Access network comprising MoCA network nodes connected by a coaxial cable network to an external data channel, said method comprising:
controlling incoming data from the external data channel; and
controlling outgoing data generated by client devices connected to the MoCA network nodes, wherein the MoCA network nodes (a) operate in accordance with a MoCA Access standard designed to prohibit data communication to be established between the MoCA network nodes via the coaxial cable network, and (b) are included in a common VLAN having a same Internet Protocol (IP) subnet within the MoCA Access network;
wherein said controlling of the incoming data comprises:
accessing a first database containing identifiers associated with the MoCA network nodes within the MoCA Access network, and
selectively, based on the first database, forwarding the incoming data to one or more of the MoCA network nodes; and
wherein said controlling of the outgoing data comprises:
accessing a second database containing the identifiers that are associated with the MoCA network nodes that are included in the common VLAN, and
selectively, based on the second database, redirecting the outgoing data to a selected MoCA network node among the MoCA network nodes that are included in the common VLAN.

21. A computer program product stored on a non-transitory computer-readable medium, the computer program product comprising instructions which when executed by a control unit, cause the control unit to:
control outgoing data generated by client devices connected to MoCA network nodes, wherein controlling the outgoing data comprises:
accessing a second database containing the identifiers that are associated with the MoCA network nodes that (a) operate in accordance with a MoCA Access standard designed to prohibit data communication to be established between the MoCA network nodes via the coaxial cable network, and (b) are included in a common VLAN having a same Internet Protocol (IP) subnet within a MoCA Access network, and
selectively, based on the second database, redirecting the outgoing data to a selected MoCA network node among the MoCA network nodes that are included in the common VLAN.

22. A computer program product of claim 21, the computer program product comprising further instructions which when executed by a control unit, cause the control unit to:
control incoming data from the external data channel, wherein controlling the incoming data comprises:
accessing a first database containing identifiers associated with the MoCA network nodes within the MoCA Access network, and
selectively, based on the first database, forwarding the incoming data to one or more of the MoCA network nodes.

* * * * *